UNITED STATES PATENT OFFICE.

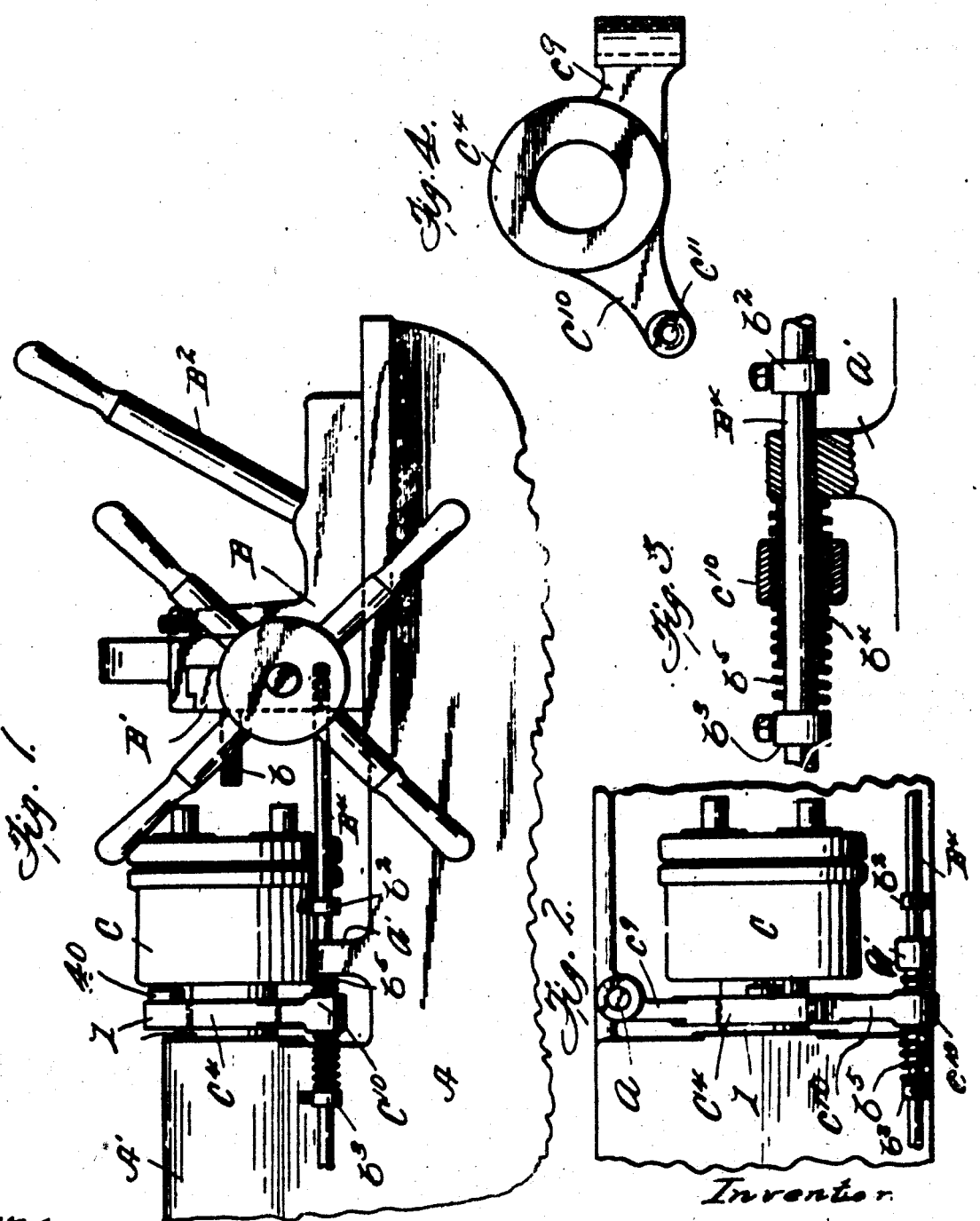

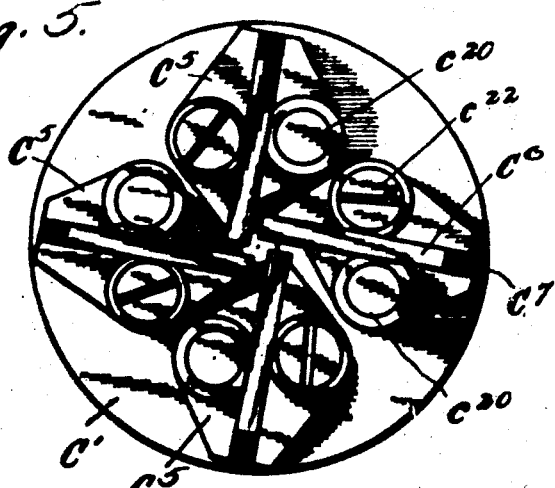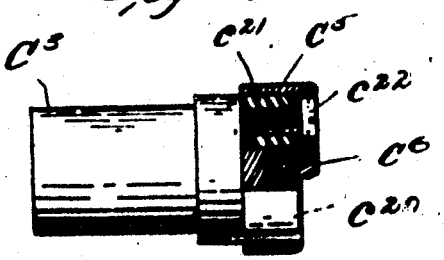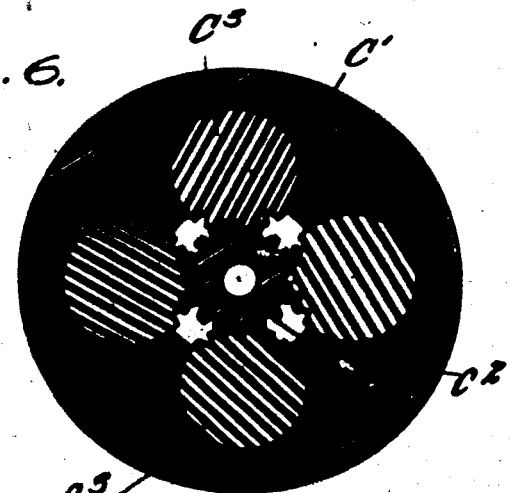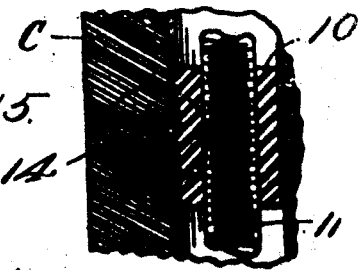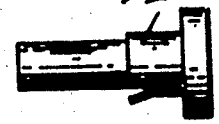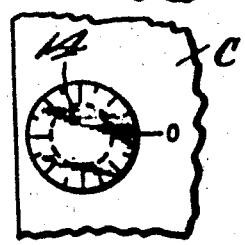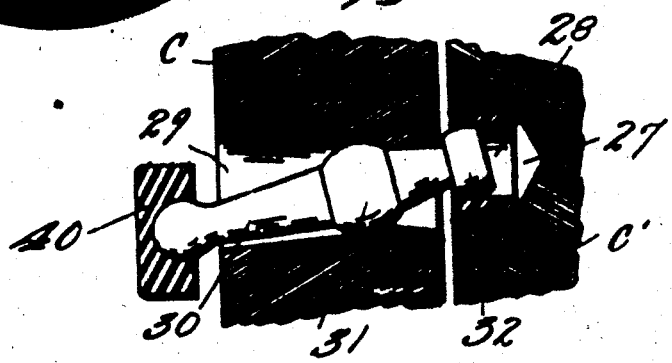

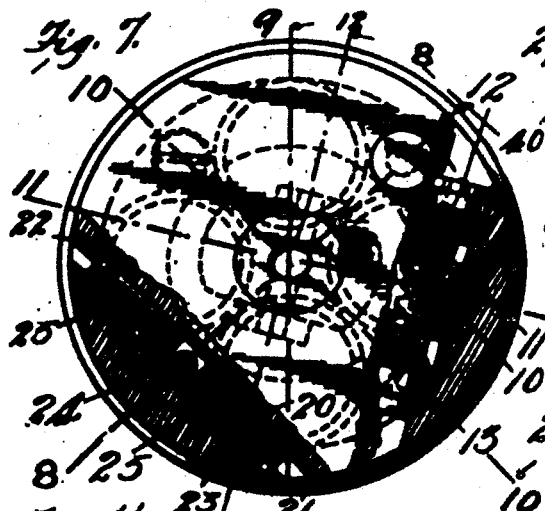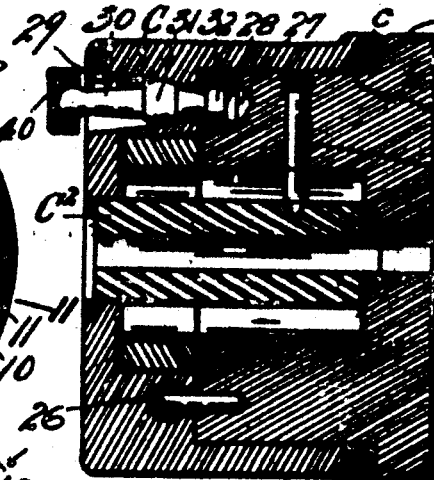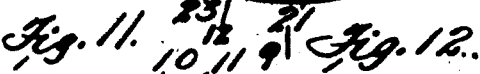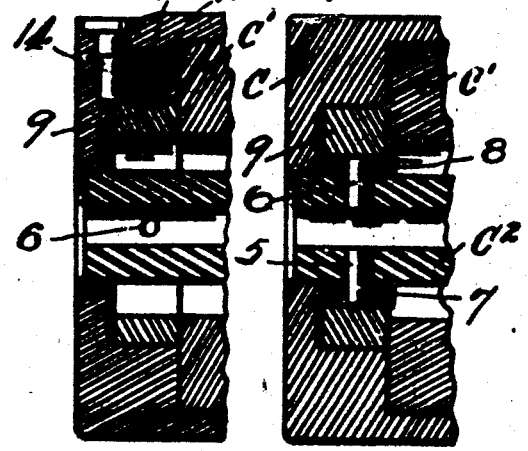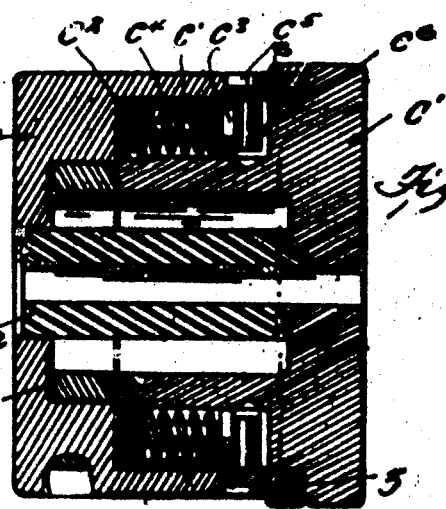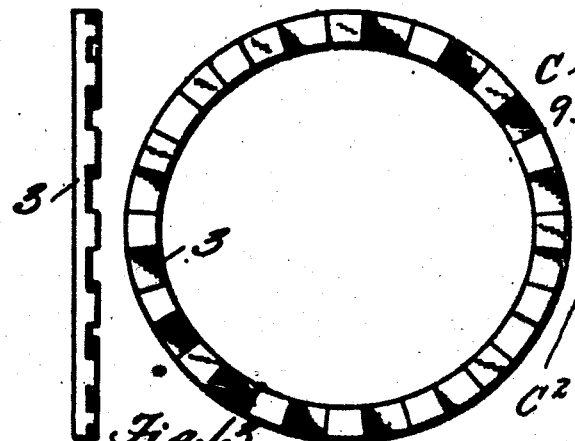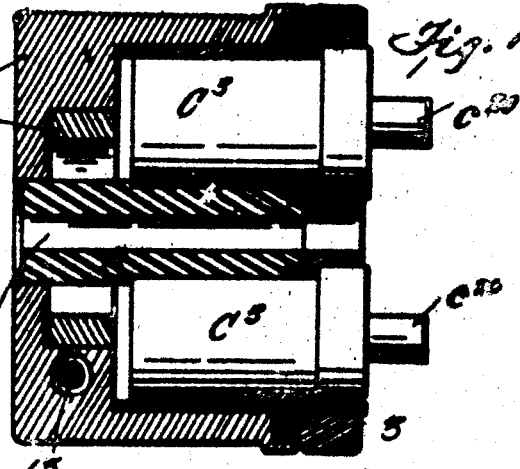

ABRAHAM B. LANDIS, OF WAYNESBORO, PENNSYLVANIA.

CUTTER-HEAD.

948,889.  Specification of Letters Patent.  Patented Feb. 8, 1910.

Application filed February 9, 1907. Serial No. 356,645.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in certain improvements in the details of construction of cutter-heads for machines for cutting threads on bolts, screws, etc., whereby a machine is provided for this purpose which will be positive and rapid in operation and perform its work in a very perfect manner, all as will be hereinafter more fully described and claimed.

Referring to the accompanying drawings which are made a part hereof and on which similar reference characters indicate similar parts, Figure 1 is a side elevation of a portion of the bed of a screw-cutting machine embodying a cutter-head of my improved construction, Fig. 2 a top or plan view of the portion thereof carrying the cutter-head, Fig. 3 a detail sectional view through a part of the means for operating the die-closing mechanism, Fig. 4 a detail view of the lever for operating said mechanism in elevation, Fig. 5 a front elevation of one of the cutter-heads with the parts composing the cutter-die in operative position, Fig. 6 a cross section through the cutter supporting cylinders and the casing containing the bearings therefor on the dotted line 6—6 in Fig. 9, Fig. 7 a rear elevation of one of the cutter dies partly in section, Fig. 8 a longitudinal section on dotted line 8—8 in Fig. 7, Fig. 9 a similar view on dotted line 9—9 in Fig. 7, Fig. 10 a similar view on the dotted line 10—10 in Fig. 7, and Figs. 11 to 18, inclusive. detail views illustrating parts of the mechanism on an enlarged scale and more clearly.

In said drawings the portions marked A represent the bed of the screw-cutting machine, B the work supporting carriage, and C the cutter-head. The machine may, in its general character and construction be of any approved form and the bed A is a casting of that character which will afford suitable supports and bearings for the various parts of the mechanism. The carriage B is mounted on suitable ways on the top of the bed A, and has a work holding clamp B' in which the work $b$ may be held in position to be operated upon by the die of the cutter-head C. Said carriage is operated back and forth upon the ways on bed A by any suitable mechanism, preferably a rack and pinion, through the medium of a hand lever $B^2$. The cutter-head is composed of the outside casing C and an inside casing C' both cylindrical in form. Said inner casing C' is adapted to both rotate and slide a limited distance within said casing C. Said casing C' is formed with a central longitudinal opening in which is mounted a toothed cylinder $C^2$, the rear end of which rests in a central bearing in the head of casing C and the forward end of which is formed with a shoulder and is fitted into a recess around a central perforation in the front end of the casing C'. It is held to move longitudinally with said casing C' by means of a transverse pin 2 which extends through a perforation in the wall of the casing and at its inner end engages with a groove which extends part way around the said cylinder $C^2$.

The forward end of casing C is formed with a recess under a flange $c$ in which is rigidly fixed a hardened ring 3 having clutch teeth on its outer face. A similar ring 4 with similar teeth, adapted to mesh with the teeth on ring 3, is fixed upon the adjacent face of an annular flange around the outer end of said casing C', so that when said casings C and C' are in position for the teeth of the rings 3 and 4 to mesh said casings will be held against independent rotary movement. A spring plunger is mounted in a socket or perforation formed one on each of two sides of said casing C', opposite each other, consisting of a stem $c'$ adapted to slide in a perforation in a screw plug $c^2$, which is screwed into the outer end of each of said sockets, said stem being provided with a head $c^3$, and a coiled spring $c^4$ being interposed between said head and said plug. A transverse pin $c^5$ is inserted through a perforation in the outer casing C. its inner end being provided with an anti-friction sleeve $c^6$, which projects through a slot in casing C' and across the socket containing the plunger, said sleeve resting against the head $c^3$ of said plunger. The tendency of spring $c^4$ is, therefore, to hold the parts C and C' together and the teeth on the rings 3 and 4 into engagement with each other, as it bears at one end against the sleeve $c^5$ on the pin $c^6$ attached to the casing C, and at its other end against the plug $c^7$ rigid with the casing C'. Under the head of the pin $c^6$ is formed a short screw-threaded portion which engages with screw-threads in the inner end of the perforation through the casing C and thus holds said pin in position.

Casing C' is formed with four longitudinal perforations around its central perforation, each of which cuts into said central perforation. Said perforations form the bearings for the cutter carrying cylinders $C^3$. Each of said cutter carrying cylinders $C^3$ is formed with teeth around a section of its periphery adjacent to the central cylinder $C^2$ and said central cylinder $C^2$ is formed with teeth on its periphery which mesh with said teeth of the cylinders $C^3$, as shown most clearly in Figs. 6 and 10. A wheel 9 is mounted upon the rear end of the central cylinder $C^2$. Said central cylinder $C^2$ has short transverse studs 5 and 6 projecting from opposite sides of its rear end, on the outer ends of which are mounted rollers 7 and 8, which extend into radial notches in said wheel. Said wheel 9 is thus secured to rotate with said central cylinder $C^2$ but said central cylinder is permitted a limited sliding movement in said wheel 9, the rollers 7 and 8 serving to prevent any friction or binding between the parts. Said wheel 9 is formed with teeth around a portion of its circumference on one side with which teeth a sliding rack 10, which is mounted in a transverse perforation in casing C, is adapted to engage. Said rack 10 is adapted to be operated by means of a screw 11, the inner end of which abuts against a plug 12 fixed in one end of the transverse perforation and the other end of which has a head 13 which abuts against a shoulder near the other end of said perforation. Said screw extends through a screw-threaded perforation in said rack bar. Thus said screw is held from movement in either direction and the turning of it by a screw-driver inserted in the transverse perforation, as most clearly shown in Fig. 7, will operate said rack bar in one or the other direction and thus turn the wheel 9, and through said wheel 9 the central cylinder $C^2$ and the cutter carrying cylinders $C^3$ as desired, to adjust the cutter die to the proper size. The transverse perforation in which said rack bar 10 is mounted is preferably circular and of three different sizes throughout its length. The larger size at one end to admit the screw plug 12, the intermediate size the rack bar 10 and head 13 and the smaller size to serve as an abutment for said head 13 of the screw and to admit the screw-driver from the opposite end for the purpose of turning it. Said rack bar 10 is formed with teeth on one of its other sides and a transverse pin 14 formed with longitudinal teeth on its shank is inserted in a transverse perforation in casing C with said teeth engaging the teeth of said bar so that as said bar is moved back and forth by the screw 11 it will rotate said pin 14 in its seat. The head of said pin is in the form of a disk seated in a countersunk seat around the outer end of the perforation in which it is mounted. Said head is provided with graduation marks around its periphery and a zero mark is formed on the side of casing adjacent thereto, as shown most clearly in Fig. 16. By this means the size of the die may be readily determined and secured by the adjustment of said screw 11. Another perforation 20 is formed in the casing C near the inner face of its rear end extending through from side to side of said casing. Said perforation has shoulders near each outer end formed by rings 21 and 22 set into said outer ends. A rod 23 formed with small ends, adapted to slide through perforations in said rings 21 and 22, is mounted in said transverse perforation and has an enlarged central portion 24 between which and the inner end of each ring is mounted a coiled spring 25. A pin 26 is mounted in a perforation in the casing C' and extends through a curved slot in the casing C into said transverse perforation and into an aperture formed in said enlarged portion 24. Said springs 25 are of uniform tension and are arranged to normally hold the casings C and C', when the teeth of the rings 3 and 4 are disengaged, so that the faces of said teeth will abut and not engage. The aperture in the enlarged portion 24 of the rod 23 is considerably larger than the pin 26 which allows for the independent rotary movement of cylinders for a limited distance, when forcibly operated, as will be presently described.

A socket 27 with a steel lining 28 is formed in the rear face of casing C'. Near one edge thereof and adjacent thereto in the casing C is formed an aperture in which is mounted a lever 30. Said aperture is formed flaring from near its inner end toward its outer end affording a bearing near its inner end for a ball-shaped portion 31 on said lever 30. The extreme inner end 32 of said lever is also formed ball-shaped and engages with the socket 28 in the casing C'. Its extreme outer end is also ball-shaped and engages with a shoe 40, which is adapted to bear against a circular friction face on ring $C^4$. Said ring $C^4$ has an arm $c^9$ on one side and an arm $c^{10}$ on the other, as shown in Fig. 4. The outer end of arm $c^9$ is formed with a vertical perforation and is mounted on a vertical pintle $a$ extending up from one side of the bed A. The arm $c^{10}$ has a horizontal perforation $c^{11}$ through which a rod $B^4$ extends. Said rod $B^4$ is carried by the carriage B, its outer end being screw-threaded and screwed into a screw-threaded socket in said carriage. Its inner end is supported by a standard $a'$ cast on the bed A and extending up therefrom and having a horizontal perforation therein through which said rod extends. An adjustable collar $b^2$ is mounted on said rod $B^4$ on one side of the standard $a'$ and a similar collar $b^3$ on the other side near its forward end. A sleeve $b^4$ is mounted on said rod between said standard $a'$ and the collar $b^3$ and a coiled spring $b^5$ surrounds said sleeve between said standard and said collar. Said sleeve $b^4$ is somewhat shorter than the distance between said standard $a'$ and said collar $b^3$, whereby it is permitted a limited independent movement on said rod $B^4$. The horizontal perforation through the arm $c^{10}$ of the ring $C^4$ has an internal spiral groove in the form of a thread adapted to receive the coils of the spring $b^5$, said spring being turned into said perforation in the same manner as a screw-threaded rod would be turned into a nut, the sleeve being then slid within said spring and the rod $B^4$ slid through said sleeve and the collar $b^3$ adjusted, as may be desired.

The cutter-head C has the cutter-holders $C^5$ mounted on the outer ends of the cutter holding cylinders $C^3$ in the usual or any approved manner. In the construction shown said cutter-holders are mounted upon two projecting pins $c^{20}$ and $c^{21}$ on the outer end of said cutter holding cylinders, each being held in place by a screw $c^{22}$ which screws into a perforation in the pin $c^{21}$ and the head of which bears against a shoulder around the perforation in said cutter-holder which receives said pin. The cutters $C^6$ are of substantially the same form as shown in my former patents, adjustably held in dovetailed grooves in the face of said cutter-holders by means of screw-plugs $C^7$ as shown in Fig. 5. These parts being arranged as shown in Figs. 5 and 14 and the cutter-head mounted on the machine as shown in Figs. 1 and 2 and the work secured in the work holding carriage as shown in Fig. 1, the operation proceeds as follows: The carriage is moved toward the cutter-head by means of the lever $B^2$ until the point of the bolt $b$ engages with the die formed by the cutters $C^6$ which die proceeds to cut the thread upon said bolt as it is fed forward into said die. The rod $B^4$ slides through the perforation in standard $a$ as said carriage B moves forward, the collar $b^2$ being fixed on said rod to limit the forward movement of said carriage at that point where the thread will have been cut back on said bolt the desired distance. When said point has been reached the continuation of the motion of the cutter-head will serve to pull part $C'$ of the casing longitudinally of part C until the teeth of rings 3 and 4 are free from each other when one of the springs 25, according to whether the work is being cut right-hand or left-hand, will, through its bearing upon the pin 26, serve to rotate part $C'$ slightly and open the die to free the cutters from the work and permit it to be withdrawn. Carriage B is then run back and the part of spring $b^5$ between collar $b^3$ and the arm $c^{10}$ will be compressed to force said arm toward the standard $a'$ and turn ring $C^4$ on its hinge $a$ so that its face will bear against friction shoe 40 and turn the lever 30 so as to rotate the parts C and $C'$ of the cutter-head sufficiently for the teeth of the rings 3 and 4 to again engage each other when the parts C and $C'$ will be drawn into closed position by means of the springs $c^4$, and secured closed by the engagement of said teeth, as before described. The spring $b^5$ may be adjusted so that the part on each side of said arm $c^{10}$ will be of the required length and tension for the purpose. This can be readily done by turning it back and forth in the spiral groove in said arm and adjusting the collars $b^3$ and $b^2$. The required tension of the spring can be thus secured to obtain the result sought at the different limits of the movement of the carriage B as may be made necessary by work of different lengths, as will be readily understood. The part of said spring between arm $c^{10}$ and the standard $a'$ serves to force ring $C^4$ away from said standard as soon as the carriage is moved to the cutter-head with the work so that the pressure of said ring against friction shoe 40 on lever 30 is relieved and said head allowed to run free during the operation of cutting and until the carriage is again run back to withdraw the work from the die.

Having thus fully described my said invention, what I claim as new and desire to secure by Letters Patent, is:—

1. In a screw cutting machine, the combination, of a cutter-head comprising two parts adapted to have a limited independent movement both longitudinal and rotary, rocking cutter-holders mounted in one of said parts, the cutters comprising the cutter-die mounted on said cutter-holders, means for holding said parts locked in closed position, means for rocking said cutter-holders for opening said die, and means for closing said die automatically, comprising a lever for giving the two parts of said cutter-head a rotary movement one within the other, said lever being arranged to be operated from the work holding carriage, substantially as set forth.

2. A cutter-head for screw-cutting machines, comprising a two-part casing mounted one part within the other, the inner part containing the bearings for the cutter-holding cylinders, said cylinders, the cutters mounted on said cylinders, means for holding said casing parts in closed position, means for opening said die, and means for closing it comprising a lever mounted in one of said parts and engaging at its inner end with the other in position to impart a rotary movement to said inner part of the casing, said lever being arranged to contact with a part hinged on the side of the frame and connected to be operated by a rod carried upon the work holding carriage, said hinged part, said carriage, and said rod thereon, substantially as set forth.

3. In a cutter-head, for screw-cutting machines, the combination of the casing composed of an outer and an inner part, said inner part being mounted to have a limited independent longitudinal and rotary movement and containing the bearings for the cutter holding cylinders, said cutter holding cylinders, means for locking the two parts of the casing to hold the die closed, means for opening said die, means for closing it comprising a lever mounted in a recess in the outer part and adapted to engage with the inner part to impart a limited rotary movement thereto, and means for operating said lever, substantially as set forth.

4. In a cutter-head for screw cutting machines, the combination of the casing comprising an outer and an inner part, the inner part having a central perforation with a toothed cylinder mounted therein and connected therewith to have a limited independent movement, a series of perforations surrounding said central cylinder, the several cutter holding cylinders mounted in said perforations and formed with teeth on their adjacent sides adapted to mesh with the teeth on said central cylinder, means for adjusting said central cylinder circumferentially to adjust the size of the die, means for locking said two parts of the casing when in normal position comprising annular toothed rings one fixed upon each part with their teeth adapted to mesh with each other, means for holding said two parts together with the teeth of said rings in engagement comprising springs adapted to bear against portions fixed to said two parts, means for imparting a limited rotary movement to the inner part of the casing when open comprising a lever formed with a central ball-shaped portion mounted in a recess in the outer part with its inner end engaging with a socket in said inner part, and means for operating said lever connected with the work holding carriage, substantially as set forth.

5. In a cutter-head, the combination, of a casing composed of two parts one mounted within the other, the inner part being adapted to have a limited independent longitudinal and rotary movement, a cutter-die comprising cutter-holders pivoted in bearings in said inner part and arranged to be opened and closed by the rotary movement thereof, cutters in said cutter-holders, and means for holding the two parts of said casing closed comprising inter-engaging clutch teeth on each part, substantially as set forth.

6. In a cutter-head, the combination, of a casing comprising an outer part mounted upon the machine, an inner part mounted within said outer part to have a limited rotary and longitudinal movement independent of said outer part, the cutter-holding cylinders mounted in seats in said inner part, the cutters mounted on said cylinders, springs for normally forcing said parts together longitudinally, each of said parts being provided with clutch teeth adapted to engage with each other when in closed position and hold said parts from independent rotary movement, springs arranged to turn said inner part when said teeth are disengaged to a position where said teeth will bear against the faces of each other, and means for turning said inner part back to position for said teeth to engage comprising a lever fulcrumed in the outer part and engaging with said inner part at its inner end and its outer end adapted to contact with and be operated by a part connected with the work supporting carriage, substantially as set forth.

7. In a cutter-head, the combination, of a casing comprising an outer and an inner part, the inner part carrying the cutters comprising the die, means for opening and closing said die, and means for holding said die closed comprising inter-engaging teeth on adjacent annular faces of the two parts of said casing, substantially as set forth.

8. In a cutter-head, the combination, of the casing comprising an outer and an inner part, said inner part being mounted to have a limited independent rotary and longitudinal movement, means for locking said two parts against independent rotary movement when the die is closed, means for imparting a limited independent rotary movement to said inner part when disengaged comprising a spring mounted in a socket in said outer part and adapted to bear against a part carried by said inner part and projecting through a slot into said socket, and means for returning said inner part to position, substantially as set forth.

9. In a cutter-head, the combination, of a casing comprising an outer and an inner part, the inner part being arranged to have a limited independent rotary and longitudinal movement, the cutter-holding cylinders mounted in seats in said inner part, which seats cut into the central opening in said inner part, a central toothed cylinder mounted in said opening and adapted to mesh with teeth on the surface of said cutter-holding cylinders, a toothed wheel mounted in the recess in the head of the outer part of the casing and connected to said central toothed cylinder by means of anti-friction rollers mounted on stud shafts on the sides of said toothed cylinder and engaging with recesses in said wheel, said anti-friction wheels, a sliding rack mounted in a transverse perforation in the outer casing with its teeth engaging the teeth of said wheel, a screw for operating said rack, and an indicator connected with said rack and adapted to be moved as said rack is moved, whereby the size of the die may be readily determined, substantially as set forth.

10. In a thread-cutting machine, the combination of a cutter-head comprising an outer and an inner part, the inner part being mounted to have a limited independent rotary and longitudinal movement, means for effecting said movements, the cutter die mounted on said inner part, means for opening and closing said die operated by the movement of said inner part, said means for closing the die comprising a lever mounted in the outer part and engaging with a socket in the inner part, its outer end being adapted to be operated by frictional contact with a part controlled by the travel of the work-holding carriage, and said part, substantially as set forth.

11. In a thread-cutting machine, the combination of a cutter-head comprising an outer and an inner part, means for locking said parts when in closed position, said inner part being mounted to have a limited longitudinal movement to free it from the locking means, and a limited rotary movement to operate the die opening and closing mechanism, means for effecting said movements, said die closing mechanism comprising a lever fulcrumed at a point between its ends in a suitable bearing in the outer part with its inner end engaging a socket in the inner part and its outer end arranged in the path of an adjustable friction ring, said friction ring and means for moving said ring into or out of contact with said lever connected with the work supporting carriage, substantially as set forth.

12. In a thread-cutting machine, the combination of a cutter-head comprising an outer and an inner part, means for locking said parts when in closed position, said inner part carrying the die and mounted to have a limited independent longitudinal movement to release the two parts from the locking means that holds them from independent rotary movement and limited rotary movement for operating the die opening and closing mechanism, means for effecting said movements, said die closing mechanism comprising a lever adapted to be operated to impart a rotary movement to said inner part of the casing and mounted to be operated by contact with a friction ring connected to be controlled by the work holding carriage, and said friction ring, substantially as set forth.

13. In a screw-cutting machine, the combination of a cutter-head comprising two parts, the die carried by the inner part, means for opening and closing said die operated by the independent movement of said inner part, the closing means comprising a lever the operating end of which projects from said cutter-head in position to contact with the face of a friction ring hinged to the bed of the machine on one side and connected at its other side with a rod carried by the work supporting carriage, said friction ring, and a spring arranged to both hold said friction ring yieldingly against the end of said lever when the work holding carriage is in one position and to throw it away from said lever when it moves in an opposite direction, substantially as set forth.

14. In a screw-cutting machine, the combination of the bed, the work supporting carriage, the cutter-head comprising a two part casing, the cutter die carried by the inner part of said casing and adapted to be opened and closed by the independent movement of said inner part, means for effecting said movement, the closing mechanism comprising a lever for imparting to said inner part an independent rotary movement, the end of said lever projecting in the path of a friction ring pivotally mounted upon the bed and connected with a rod carried by the work supporting carriage, said friction ring, means for limiting the movement of said carriage, and a spring mounted on said rod and adapted to force said lever into contact with said lever under a yielding pressure when the carriage moves in one direction and force it away from said lever when the carriage moves in the opposite direction, substantially as set forth.

15. In a cutter-head, the combination of the opening mechanism, the closing mechanism, the operating mechanism, and the setting mechanism, said setting mechanism comprising an indicator dial geared to the setting device, whereby as said setting device is adjusted said indicator dial will be turned to indicate the size of the die, substantially as set forth.

16. In a screw cutting machine, the combination of the work holding carriage, the cutter-head, means for operating said carriage, means for operating said head, the cutting die carried by said head, means for opening said die, and means for closing said die comprising a lever mounted upon and connected with appropriate parts of said head and arranged to be operated by frictional contact with a part arranged to be brought into or out of operative position by the movement of said carriage, substantially as set forth.

In witness whereof, I have hereunto set my hand and seal at Washington D. C. this 22nd day of January, A. D. nineteen hundred and seven.

ABRAHAM B. LANDIS. [L. S.]

Witnesses:
E. W. BRADFORD,
A. M. PARKINS.